Oct. 16, 1962

A. E. JOHNSON 3,059,164

DUAL POWER SOURCES

Filed Aug. 27, 1958

INVENTOR.
ARTHUR E. JOHNSON

BY Andrus + Starke

Attorneys

Oct. 16, 1962
A. E. JOHNSON
3,059,164
DUAL POWER SOURCES
Filed Aug. 27, 1958
2 Sheets-Sheet 2
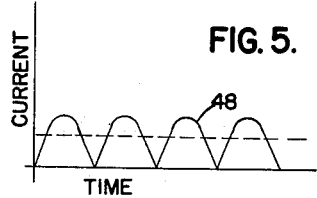
FIG. 5.
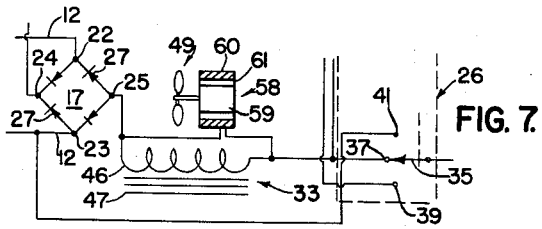
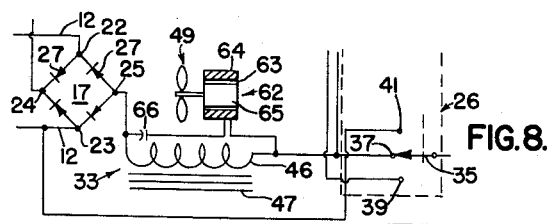
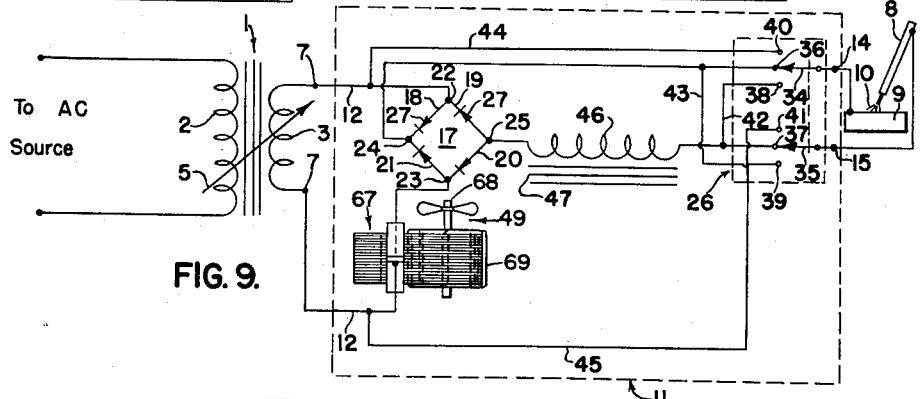
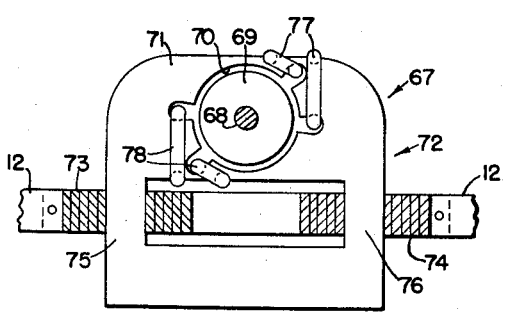
*INVENTOR.*
ARTHUR E. JOHNSON
BY *Andrus + Starke*
Attorneys

United States Patent Office 3,059,164
Patented Oct. 16, 1962

3,059,164
DUAL POWER SOURCES
Arthur E. Johnson, Elkhorn, Wis., assignor to A. O. Smith Corporation, Milwaukee, Wis., a corporation of New York
Filed Aug. 27, 1958, Ser. No. 757,611
25 Claims. (Cl. 321—8)

This invention relates to dual power sources having means to energize a main high energy load and to simultaneously energize a low energy load in proportion to the energization of the main load and is more particularly directed to an alternating current to a direct current convertor having temperature sensitive rectifying circuit means and cooling means interconnected with the rectifying circuit means to cool the rectifying means in proportion to the load current. The converter is particularly adapted to be connected to the output of conventional alternating current arc welding machines to establish a direct current suitable for arc welding.

This application is a continuation-in-part of applicant's copending patent application, Serial No. 601,786, which was filed August 2, 1956, and entitled "Dual Current Source," and now abandoned, and also applicant's copending application, Serial No. 695,651, which was filed November 12, 1957, and is entitled "Load Responsive Motor," and now abandoned.

Arc welding processes have been developed for rapidly and efficiently joining metal members. Certain welding processes for joining metal members employ an alternating current (A.C.) power supply to establish alternating current flow through the arc. Other processes employ a direct current (D.C.) power supply to establish direct current in the arc.

The type of power supply employed varies with the type and thickness of the work and the electrode, with the shielding medium employed to prevent contamination of the arc and the like.

Both alternating current and direct current power supplies establish a relatively low voltage to reduce the danger of shock to the welding operators. Suitable transformers are generally employed to reduce the conventional 120 volt and 220 volt line voltage to a voltage suitable for arc welding The direct current welding units are constructed by connecting a full wave rectifier to the output of an alternating current welding transformer. The rectifier is universally constructed with solid state rectifying elements of selenium or silicon to create unidirectional current flow through the elements. The direct current output of the rectifier is a series of unidirectional current pulses which are evened out by connecting a smoothing inductor or reactor in the direct current output circuit.

The power sources are either of the constant potential variety or the constant current variety. The constant current power supply includes voltage dropping impedance, in the output circuit to establish a dropping voltage-current characteristic. The open circuit voltage is relatively high compared to the voltage during the welding operation. The high open circuit voltage is necessary to initially strike the arc between the electrode and the work. Once the arc is struck the voltage drops rapidly with an increase in current.

The constant potential power source is adapted to selectively establish predetermined output voltages which remain at an essentially constant voltage for all arc currents. The current is determined by the rate of electrode feed. Direct current power supplies may employ either type of transformer.

The current flow through solid-state rectifying devices employed to establish a direct current output generate a substantial quantity of heat, generally in direct proportion to the current flow. If the heat is not rapidly dissipated, permanent damage to the rectifying devices results. Therefore, forced cooling means, generally in the form of forced air cooling, is employed to carry away the generated heat.

A conventional line voltage fan unit is usually employed and energized by connecting the fan motor across the incoming power lines or a portion of the transformer winding for continuous operation.

Generally entirely separate welding machines are maintained for alternating current and direct current arc welding in accordance with the amount of the corresponding welding operations. A combined power source which is selectively adapted to serve as either an alternating current or a direct current power source is also available. The combined A.C.-D.C. power source includes a transformer and rectifying circuit with suitable switches to cut the rectifying circuit in and out of circuit. The combined unit is relatively expensive and alternating current welding machines which are relatively inexpensive are purchased as entirely satisfactory for the majority of the arc welding processes. When the demand warrants the additional expense, a separate D.C. welding power source or a combined A.C.-D.C. power source is obtained. In either case, this additional expense is created because the alternating current machines in current service cannot be used in a direct current welding operation.

In accordance with the present invention, a separate and completely self-contained convertor is provided which is adapted to be easily and rapidly connected to the output of any conventional alternating current arc welding transformer to establish and maintain a direct current suitable for direct current arc welding. The converter unit includes suitable solid-state rectifying means which allow construction of a small, compact unit. A cooling device is suitably mounted within the convertor and interconnected with the conversion circuit for energization. Thus, a pair of cable connections or the like from the converter to the transformer output terminals and the usual connections to the electrode and the work are all that are necessary to convert to a D.C. output. The cooling means is connected with the conversion circuit to establish a load determinant operation of the cooling means.

If the cooling device of the converter is connected across the main voltage supply in the rectifying circuit and the convertor is connected to a constant potential A.C. welding power source, the cooling device must be selected to operate at maximum cooling output for the lowest voltage setting because the main current is generally independent of the voltage. This manner of carrying out the invention is relatively expensive and inefficient.

In a constant current welding power source, a cooling device interconnected across the main voltage supply or main load lines in the rectifying circuit provides reduced cooling effect as the load increases because of the drop in voltage and the cooling effect is actually the reverse of the cooling demand. Further, protective means must be provided against short circuit conditions when no or low voltage, high currents are established. Consequently, this manner of carrying out the invention, is also expensive.

It has been found that the most satisfactory and novel system for practicing the invention comprises an internally interconnected cooling device within the convertor unit which is automatically connected for operation by energizing the device in accordance with the welding current flow and consequently the cooling demand.

In accordance with another aspect of the present invention, a low energy cooling unit is employed which is operated by the alternating current component in the direct current flowing in the arc welding circuit. This alternating current component is inherent in all rectifying circuits employing solid-state rectifying devices and the like. The amplitude of the alternating current component is generally directly proportional to the amplitude of the average direct current. Therefore, in accordance with this aspect of the invention the fan operation and the resultant cooling effect is directly proportional to the welding current output and closely follows the cooling demand requirements.

The alternating current component in the direct current circuit may be readily picked up by inductively coupling an output winding to the winding of the smoothing inductor normally employed in the direct current output circuit. The smoothing inductor then acts as a primary winding of a current transformer to drive the fan motor in direct proportion to the welding current output. However, by suitable motor selection, the motor may be connetced directly across the inductor winding or some similar winding which is connected in the output circuit.

Although described particularly in connection with the convertor assembly, the alternating current component concept may be applied wherever a low energy alternating current source in proportion to a heavy direct load current is needed or desired.

In accordance with another aspect of the invention, a shaded pole-motor or the like is provided to drive the cooling fan. The conventional large numbers of turns of fine wire normally found in the field winding of the motor is replaced with a few turns of heavy load current conductors which are connected in the main load circuit. The electrical excitation of the magnetic circuit is consequently in direct proportion to the load current and the motor operates accordingly.

In arc welding circuits and the like employing air cooled rectifiers, a shaded pole-motor is employed because the response of the motor operation is sufficiently fast to provide the necessary cooling during the initial striking of the welding arc when large, short-circuit currents are flowing as well as during the subsequent welding operation.

The method of driving a small auxiliary motor by linking directly with the load current conductor may be employed in other electrical circuits. For example, components other than rectifiers such as resistors and windings and other temperature sensitive components often require forced cooling to obtain maximum efficiency and may be cooled in accordance with this cooling means. The cooling method is very satisfactory because the cooling effect increases very rapidly in accordance with the load demand which is flowing through the device and consequently the cooling means do not have to be continuously operated at maximum output.

The present invention provides a small, compact convertor which is easily portable for rapidly changing between an alternating current arc welding output and a direct current arc welding output.

The present invention provides simple and inexpensive means of energizing the excitation circuit of a low energy motor and the like to operate the motor in proportion to the relatively heavy load current. The means are particularly adapted to provide the required cooling of rectifier elements in a direct current arc welding convertor to avoid the necessity of connecting the cooling means to a separate voltage source.

The drawings furnished herewith illustrate the best mode presently contemplated for carrying out the invention.

In the drawings:

FIG. 5 is an illustrative curve of direct current supplied to the arc welding circuit;

FIG. 6 is an enlarged elevational view of a conventional silicon rectifying unit adapted to be employed in the circuit of FIG. 2;

FIG. 7 is a modified portion of FIG. 3 showing an alternative method of driving the fan motor;

FIG. 8 is a view similar to FIG. 7 showing further modification for driving a fan motor;

FIG. 9 is a diagrammatic illustration of a circuit similar to FIG. 3 with the fan motor energized on the input side to the rectifying unit; and FIG. 10 is an enlarged view of the fan motor shown in FIG. 9.

Figure 1:
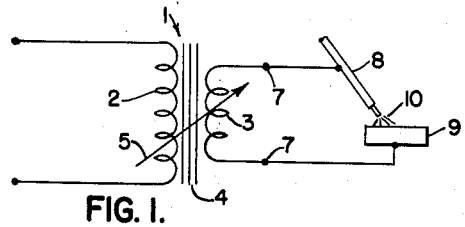
FIGURE 1 is a schematic circuit diagram of an arc welding circuit with the electrode and work shown diagrammatically.

Referring to the drawings and particularly to FIG. 1 thereof, a single phase transformer 1 is conventionally shown having a primary winding 2 connected to a suitable source of alternating current, such as the conventional 60 cycle distribution current. A secondary winding 3 is inductively coupled to the primary winding 2 by a magnetic core 4. The turns in the primary winding 2 and in the secondary winding 3 are related to reduce the incoming voltage to a suitable level for arc welding operations. The windings 2 and 3 of transformer 1 are adjustably related, as shown by overlying arrow 5 in FIG. 1, to allow adjustment of the inductive coupling between the two windings and consequently of the welding output current. This form of construction results in a relatively high leakage flux between the primary winding 2 and the secondary winding 3 and establishes a conventional drooping voltage versus current characteristic or curve 6, such as shown in FIG. 2.

A pair of output terminals 7 are provided at opposite ends of the secondary winding 3 and are adapted to be connected respectively to an electrode 8 and a work member 9. When the transformer circuit is completed an arc 10 is readily established between the electrode 8 and the work 9 to effect a desired welding operation.

Figure 2:
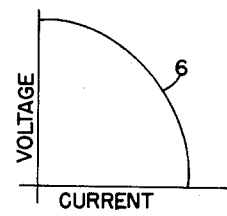
FIG. 2 is an illustrative graph of the voltage-current characteristic of an arc welding transformer having a drooping voltage versus current characteristic.

Referring to FIG. 2, the open circuit voltage of the arc welding transformer 1 is relatively high. However, when an arc 10 is established, the voltage drops to a substantially lower value with the current increasing in accordance with the characteristic curve. For example, a typical welding transformer has an open circuit voltage of the order of 75 volts. However when the arc 10 is struck, the voltage drops to about 30 to 40 volts.

Although alternating current arc welding is widely employed, there are certain metals and welding processes wherein a direct current is preferably supplied to the arc. In accordance with the present invention, any alternating current arc welding transformer such as diagrammatically shown in FIG. 1 is converted to a direct current arc welding output by a small, compact and self-contained convertor.

Figure 3:
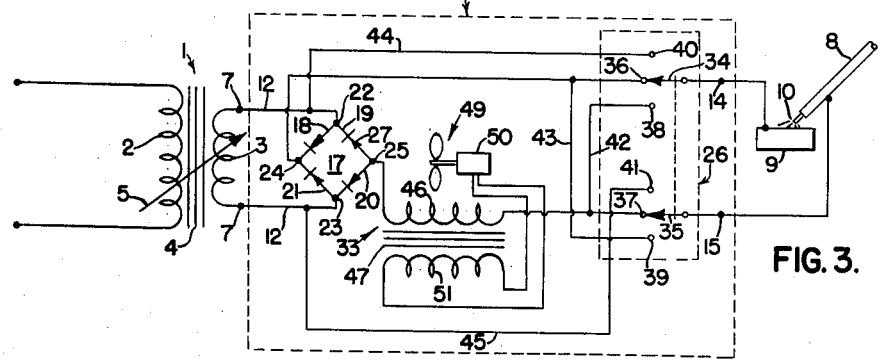
FIG. 3 is a schematic circuit showing a direct current convertor unit adapted to change the alternating current output of FIGURE 1 to a direct current output suitable for direct current welding.
Figure 4:
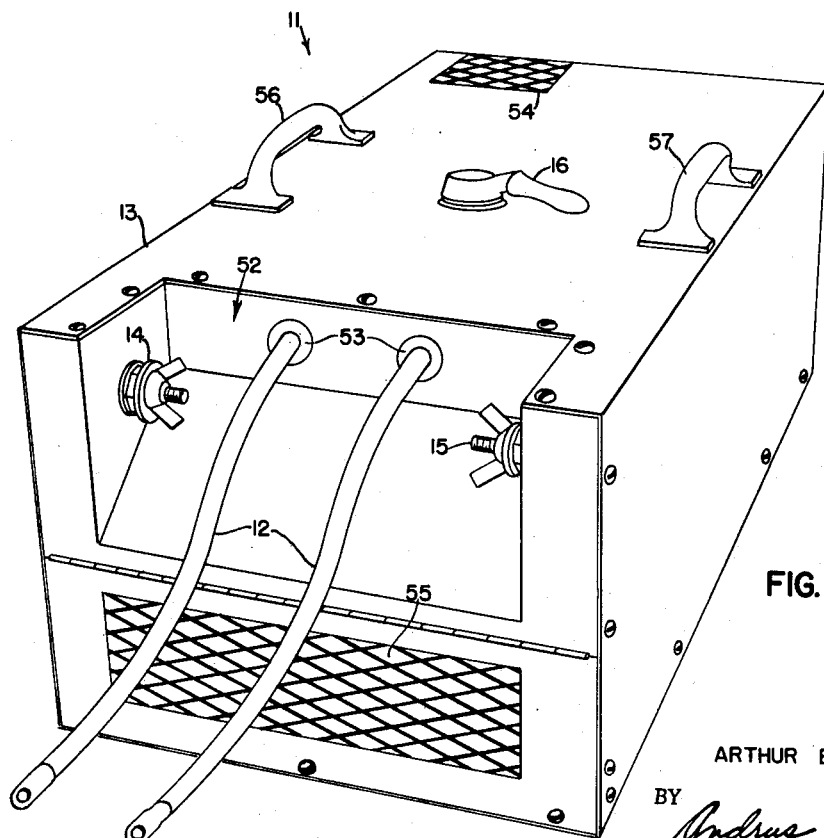
FIG. 4 is a perspective view of a D.C. convertor made in accordance with the present invention.

Referring particularly to FIGS. 3 and 4, a preferred embodiment of a direct current convertor 11 is illustrated. The convertor 11 includes a pair of input cables 12 which extend outwardly from a convertor housing 13 and are adapted to be connected to output terminals 7 of a transformer 1. A ground or work terminal 14 and an electrode terminal 15 are mounted in the housing 13 and are adapted to be connected to the work 9 and electrode 8, respectively. A switch control arm 16 is mounted on the housing 13 to selectively establish either direct current or alternating potential at the terminal 14 and 15 for arc welding. The D.C. convertor 11 is constructed as a separate self-contained unit having the housing 13 to support and enclose the various components shown in FIG. 3.

Referring particularly to FIG. 3, the D.C. convertor includes a conventional full wave bridge rectifier 17 having four individual rectifying branches 18, 19, 20 and 21 which are serially connected in a closed loop. One pair of opposed junctions of the rectifier branches constitutes a pair of input terminals 22 and 23 which are connected to the connecting cables 12 for connection to the output terminals 7 of the arc welding transformer 1. The opposite pair of junctions within the rectifier loop constitutes a pair of output terminals 24 and 25 which are adapted to be selectively connected to the electrode terminal 15 and the work terminal 14 by a double pole, triple-throw switch 26.

A solid-state rectifying device 27 is connected in each individual branch 18—21 of rectifier 17 and is polarized to allow current flow in the corresponding branch in a preselected direction. The rectifying devices 27 immediately adjacent the input terminals 22 and 23 are oppositely polarized to allow current to flow away from the terminals 22 and 23 through the rectifying devices 27 in branches 18 and 20 and to flow to the terminals through the opposite rectifying devices 27 in branches 19 and 21. The connection of the rectifying devices 27 with respect to the output terminals 24 and 25 then establishes a unidirectional current.

Each of the rectifying units 27 comprise a plurality of solid-state rectifying devices such as a conventional long-life silicon type, shown in FIG. 6. The unit includes a solid electrical and heat conductive base 28 having an integrally extended supporting stud 29. The base 28 and integral stud 29 serve as a heat sink to carry away heat generated during the rectifying action and also serve to mount the unit in a suitable connecting plate, not shown. A silicon wafer 30 is soft-soldered or otherwise secured in intimate electrical contact with the surface of the base 28 opposite the supporting stud 29. An output lead 31 is soft-soldered or otherwise secured to the silicon wafer 30 within an enclosing metal housing 32. The housing 32 serves to prevent contamination of the silicon wafer 30 and also protects the wafer against mechanical damage. Suitable heat transmitting and insulating material, not shown, may be disposed within the housing 32.

The silicon rectifiers 27 restrict the current flow therethrough to a forward direction. Consequently, when the bridge circuit 17 is connected in the welding circuit, the current flow is always from bridge terminal 24 and toward bridge terminal 25 with respect to arc 10. The current flow is a series of connected pulses which are reduced to relatively constant value by a smoothing reactor 33 which is serially connected in the output circuit of the convertor 11.

The double-pole, triple-throw switch 26 is adapted to selectively connect the convertor output terminals 14 and 15 in either of three positions for straight polarity direct current arc welding, reverse polarity direct current arc welding and alternating current arc welding. In straight polarity arc welding, the direct current flow is from the work 9 to the electrode 8 whereas in reverse polarity arc the current flow is from the electrode 8 to the work 9.

The switch 26 includes a first common pole 34 which is connected to the ground or work output terminal 14 of the convertor 11 and second common pole 35 which is connected to the electrode output terminal 15 of the convertor 11. The common poles 34 and 35 are ganged together and attached to the exteriorly operated handle 16 mounted on the top of the convertor housing 17. The handle 16 is rotatable to selectively engage the common poles 34 and 35 with corresponding straight polarity contacts 36 and 37, reverse polarity contacts 38 and 39 and alternating current output contacts 40 and 41.

The straight polarity contact 36 which is operatively associated with the work control switch pole 34 is connected to the output terminal 24 shown to the left in FIG. 3. The opposite straight polarity contact 37 which is associated with the electrode control switch 35 is connected to the output terminal 25, shown to the right in FIG. 3 in series with the smoothing reactor 33. The direct current flow through arc 10 is consequently from the work 9 to the electrode 8. The alternating current flows through the rectifying elements 27 in the opposite rectifying branches 18 and 20 during one half cycle of the alternating current input and in the opposite rectifying branches 19 and 21 during the opposite half cycles.

The reverse polarity contact 38 which is operatively associated with the work switch pole 34 is connected by a jumper lead 42 to the output terminal 25 in series with reactor 33. The reverse polarity contact 39 which is operatively associated with the electrode pole 35 is connected by a suitable jumper lead 43 to the output terminal line 24. With the contact poles 34 and 35 disposed in engagement with contacts 38 and 39 the connection of the electrode 8 and the work 9 is reversed and the direct current through arc 10 now flows in the opposite direction, that is from the electrode 8 to the work 9.

The convertor also permits connection directly to the alternating current output of the transformer 1. Referring particularly to FIG. 3, the alternating current contact 40 of control switch 26 is connected by a jumper lead 44 directly to the input cable 12 which is adapted to be connected to transformer output terminal 7. Similarly, a jumper lead 45 connects the alternating current contact 41 directly to the other input cable 12. When the common poles 34 and 35 are disposed to engage the alternating currents contacts 40 and 41, the current from the transformer secondary 3 bypasses the rectifying circuit 17 due to the shorting or bypassing by jumper leads 44 and 45 and is supplied directly to the electrode 8 and work 9 to establish an alternating current flow through the arc 10.

The smoothing reactor 33 is connected in the output circuit of the rectifier 17 to reduce the effect of the peaks of the alternating current pulses and thereby stabilize the arc 10. The reactor 33 comprises a winding 46 which is wound on an iron core 47 and which is connected in one of the rectifier output leads, shown for purposes of illustration as the lead connected to the right hand output terminal 25. The reactor 33 smooths out the pulsation of current and provides a more continuous and directional current which is typically shown in FIG. 5. However, a small alternating current component 48 remains superimposed on the average direct current value.

The rectifier 17 is forced air cooled by a small motor driven fan 49. The motor 50 of fan 49 is adapted to be energized from the low voltage, generally 120 cycle alternating current drop across the reactor coil 46.

In accordance with the illustrated embodiment of the invention shown in FIG. 3, an output or secondary winding 51 is wound on the reactor core 47 and is thereby inductively coupled to the smoothing reactor winding 46. The fan motor 50 is connected across the secondary winding 51 and energized accordingly.

The smoothing reaction of the coil 46 in relation with core 47, shown in FIG. 3, establishes a corresponding alternating flux in the reactor core 47. The changes in the value of the flux induces an alternating current voltage in the secondary winding 51. This output voltage is suitable for driving the small alternating current fan motor 50.

The fan 49 is mounted within the convertor housing 13 and provides positive air cooling of the rectifying elements 27.

The voltage induced in coil 51 is predominantly twice the frequency of the alternating current output of the transformer. The fan 49, or other cooling device connected thereto, must therefore be adapted to operate on that frequency. For example, if the alternating current source in the conventional 60 cycle power source, the output voltage from winding 51 is generally 120 cycles per second and the fan motor 50 is constructed to operate incident to energization from a 120 cycle source.

The amplitude of the alternating current component 48 of the output current from the rectifier 17 varies in accordance with the amplitude of the direct current pulses. Consequently, the voltage induced in the secondary winding 51 and the power supplied to the fan motor 50 varies in the same manner. The fan 49 is then energized in accordance with the cooling demand or load which varies directly with the amplitude of the direct current supplied to the arc 10. Thus, as the current through the rectifying elements 27 increases and generates more heat, the voltage drop across coil 46 increases simultaneously and energizes the motor 50 to rotate faster and increase the flow of cooling air.

The smoothing reactor 33 is only connected in the circuit when switch 26 is positioned to establish a direct current output. The fan 49 is therefore only energized when direct current is flowing in rectifier 17 and generating an appreciable quantity of heat.

Referring particularly to FIGURE 4, the illustrated convertor 11 includes the housing 13 which is generally formed as a rectangular box-like member of suitable sheet metal. The rectangular construction is easily fabricated and allows placement of the convertor on the top of the conventional arc welding transformer which is generally provided with an unobstructed upper surface, not shown. The upper, front portion of the housing 13 is recessed as at 52. The input cables 12 extend outwardly through suitably grommeted openings 53 in a front wall portion of the recess 52. The electrode and work terminals 14 and 15 are mounted on the side walls of the recess 50 and are thus conveniently located for connection to the electrode and work leads without interference with the input cables 12. The switch handle 16 is conveniently mounted on the top of the housing 13 and extends downwardly into operative connection to the common control switch pole 34 and 35. Suitable indicia, not shown, is provided on the upper surface of the housing 13 to show the operative connection in which the circuit is set. Screened air vents 54 and 55 are provided adjacent the rear top portion of the housing 13 and the front lower portion. When the fan 49 is driven, the cooling air is drawn rearwardly through the front lower vent 55 and through the housing 13, passing over the rectifier 17 to carry away the heat, and discharged upwardly through the top air vent 54.

Suitable handles 56 and 57 are secured to the opposite sides of the upper portion of the housing 13 to allow ready carrying and positioning of the convertor.

The convertor 11 is adapted for convenient storage in a central supply crib, not shown, from which it can be easily taken and quickly delivered to an alternating current welding transformer. The convertor 11 is preferably placed upon the top of the transformer welding unit and the input cables 12 brought down and connected to the output terminals 7 of the transformer 1.

The electrode cable is connected to the electrode terminal 15 and the work cable connected to the convertor work terminals 14. The connection of the input cables 12 simultaneously connects the rectifier 17 and the fan 49 into circuit to allow direct current arc welding. The fan is maintained in stand-by position and responds to the direct current supplied to the arc 10 to provide adequate and positive cooling of the rectifying devices 27.

A converter constructed in accordance with the present invention provides rapid connection of the convertor for temporary, intermittent or permanent direct current arc welding. The portability of the converter allows changing the most conveniently located arc welding transformer to a direct current output. Where the welding unit must be alternately employed for alternating and direct current arc welding, the direct current convertor is permanently connected to the transformer unit and the desired welding output obtained merely by positioning of a control arm or the like.

The fan motor 50 shown in FIG. 3 is energized by an inductive connection to the smoothing reactor 33 and thus isolated from the direct current in the welding circuit. The low voltage across the reactor 33 may be stepped up by the transformer action between windings 46 and 51.

The excitation circuit of the fan motor may also be conductively connected directly across the reactor 33 as shown in FIGS. 7 and 8 which are diagrammatic circuit diagrams showing a portion of the convertor circuit shown in FIG. 3 with the alternative motor connections. The same elements in FIGS. 3, 7 and 8 are given the same number and FIGS. 7 and 8 are described to the extent necessary to clearly understand the illustrated embodiments of the invention.

Referring particularly to FIG. 7, a fan motor 58 includes a rotor 59 rotatably supported within an annular stator 60. The stator is connected directly across the reactor winding 46 for energization and the rotor 59 is connected to drive the fan 49. A relatively large air gap 61 is provided between the rotor 59 and the stator 60 to substantially eliminate the effect of the direct current potential which exists across the reactor winding 46 and which is consequently applied to the stator. The conventional arc welding circuit generates a generally 120 cycle alternating current voltage of approximately 16 to 18 volts across the reactor winding 46 which is suitable for driving the motor 58.

FIG. 8 illustrates a direct connection similar to FIG. 7 except with a fan motor 62 having a relatively small air gap 63 between an annular stator 64 and a rotor 65. The small direct current potential across the reactor winding 46 would tend to saturate the magnetic circuit and stop motor operation. A large blocking capacitor 66 is connected in series with the stator 64 across the reactor winding 46. The capacitor 66 is selected to substantially pass all of the alternating current component from the stator. The stator 64 is consequently never saturated with direct current flux and operates to drive fan 49.

Although the method of driving the fan motor is particularly described with respect to an arc welding converter the concept of employing the low energy alternating current which appears as ripple in the direct current circuit may be applied in other applications which simultaneously include a relatively heavy direct current load and a relatively small alternating current load.

It is particularly applicable to a self-contained welding converter because it eliminates the need for a separate 110 volt source to drive the cooling fan. The fan automatically starts and stops with the welding operation and special starting relays and control circuits are avoided.

Direct current welding circuits employing drooping resistors in series in the output circuit are also known. A direct current fan motor may be energized in such a unit by tapping the required voltage from the resistor. The D.C. voltage drop across the smoothing reactor or a separate resistance, not shown, in the D.C. circuit may be employed to drive a suitable D.C. motor. Similarly, a resistance may be added in the A.C. circuit of the converter to drive a suitable A.C. motor.

Thus, in accordance with the broadest aspect of the present invention the fan may be driven by any suitable electrical coupling means adapted to derive power from the converting circuit.

Referring particularly to FIG. 9 of the drawing, an arc welding circuit generally similar to FIG. 3 is illustrated employing a fan motor 67 connected for operation to the alternating current side of the rectifier 17. The corresponding elements of FIGS. 9 and 3 which function the same are given the corresponding numbers and no further description thereof is given except in connection with description of the fan motor 67.

Fan 49 is secured to shaft 68 of a conventional shaded-pole motor 67; for example, as shown in U.S. Patent 2,492,207 to E. W. Ballentine. The motor 67 includes a squirrel cage type rotor 69 mounted upon the shaft 68. The rotor 69 is disposed within a corresponding opening 70 extending axially through a relatively wide leg 71 of a laminated rectangular core 72.

A pair of field coils 73 and 74 are wound one each on each of a pair of side legs 75 and 76 of the core 72 and are serially connected with each other by a portion of cable 12 connected to the input terminal 23 of rectifier bank 17 and adapted to be connected to the secondary winding 3. The coils 73 and 74 are formed of relatively few turns, shown as five turns per coil in FIG. 10 and of a heavy conductor which is rated to carry the load current.

A number of shading coils or rings 77 and 78, in the form of closed loop conducting members, are wound upon the core member 72 on opposite sides of the rotor opening 70 to produce a rotating field and a resultant starting torque. The shading coils or rings 77 and 78 are shorted windings, such that when current flows through coils 73 and 74, a current is induced in each short-circuited shading ring 77 and 78. This current established a magnetic flux which lags the main flux established by the main load current through the coils 73 and 74 and produces a rotating magnetic field to start the motor 67.

The speed of the motor 67 and therefore of the fan 49 is directly proportional to the excitation of the field core 72 by coils 73 and 74. In the illustrated embodiment of the invention, the speed of the motor 67 is directly proportional to the entire load current which flows through coils 73 and 74 to excite the core. Consequently, the cooling effect is also directly proportional to the load current.

Further, the cooling fan 49 automatically starts and stops in synchronism with the welding operation and also avoids the necessity of special starting relays in control circuits to energize the fan from the conventional 110 volt source.

The response of the shaded pole fan motor 67 is sufficiently rapid to provide the necessary cooling during the starting of the arc 10 as well as after the arc has been established.

The present invention provides a direct current convertor having a built-in cooling means. The provision of cooling means is operated directly from a permanent and internal connection in the convertor and thereby eliminates the necessity of a separate voltage source or the like.

The apparatus is equally applicable to multi-phase circuits as well as to single-phase circuits.

Certain features of the present invention may find suitable application in other power supplies. For example, the method of providing alternating current energy in proportion to the ripple component in the direct current output of a rectifying unit may be used in any other suitable direct current circuit. Similarly, the shaded pole energization circuit of FIGS. 9 and 10 may be applied to other load circuits where an alternating current motor having a relatively low output is to be energized in accordance with a relatively heavy load current.

The convertor of the invention provides a separate portable accessory for alternating current arc welding units to make the latter available as a source of A.C. or D.C. arc welding current with single connection means to the A.C. unit for conversion of the current and for cooling of rectifying elements.

Various modes of carrying out the invention are contemplated as being within the scope of the following claims particularly pointing out and distinctly claiming the subect matter which is regarded as the invention.

I claim:

1. A converter unit adapted to be atttached to the output of a separately housed A.C. transformer power source, which comprises a housing separate from said transformer housing, convertor circuit means within the housing having input terminals adapted to be connected to said transformer output, cooling means supported by the housing in cooling relation to the rectifying circuit, and circuit means interconnecting said cooling means and said converter circuit means to operatively connect the cooling means incident to connection of said converter circuit to said transformer output to provide cooling means which is directly responsive to the flow of current in the convertor circuit.

2. A conversion unit adapted to be attached to the output of a separately housed A.C. arc welding machine to establish a direct current output suitable for arc welding, which comprises a housing separate from said transformer housing, a convertor circuit mounted within the housing and having input terminals adapted to be connected to the output of an arc welding machine, cooling means supported by the housing in cooling relation to the convertor circuit, and circuit means connecting said cooling means in said convertor circuit means to respond to flow of welding current to provide cooling of the convertor circuit during direct current arc welding when said convertor circuit is connected to said transformer output.

3. A conversion unit adapted to be attached to the output of an A.C. arc welding machine to establish a D.C. output suitable for arc welding, which comprises a separate housing having input terminal means and output terminal means, a rectifier assembly within the housing having an input circuit connected to said input teminal means and having an output circuit, and cooling means mounted in cooling relation to said rectifier assembly and connected in circuit with said rectifier assembly for energization and for cooling the rectifier assembly in response to arc welding current to prevent overheating of said rectifier assembly.

4. A conversion unit adapted to be attached to the output of an A.C. welding machine to establish a D.C. output suitable for arc welding, which comprises a housing having input terminal means and output terminal means, a convertor assembly mounted within the housing and having an input circuit connected to said input terminal means and having an output circuit, an impedance element serially connected in the convertor assembly circuit, and cooling means mounted in cooling relation to said rectifier assembly and coupled to said impedance element for energization in response to arc welding current flowing therein including the periods of short circuit when the circuit voltage approaches the minimum value.

5. A conversion unit adapted to be attached to the output of an A.C. arc welding machine to establish a direct current suitable for arc welding, which comprises a housing having input terminal means and output terminal means, a rectifier assembly within the housing having an input circuit connected to said input terminal means and having an output circuit, a smoothing inductor serially connected in said output circuit, cooling means mounted in cooling relation to said rectifier assembly, and a winding mounted in inductive relation to said smoothing inductor and connected to energize said cooling means.

6. A conversion unit adapted to be attached to the output of an A.C. arc welding machine to establish a D.C. output suitable for arc welding, which comprises a housing having input terminal means and output terminal means, a full wave rectifier assembly within the housing having an input circuit connected to said input terminal means and having an output circuit, a smoothing inductor serially connected in said output circuit, and electrically operated cooling means mounted in cooling relation to said rectifier assembly and having an energizing winding conductively connected across said smoothing inductor to establish cooling in direct proportion to the load current when supplying direct current to an arc.

7. A conversion unit adapted to be attached to the output of an A.C. arc welding machine to establish a D.C. output suitable for arc welding, which comprises a housing having input terminal means and output terminal means, a rectifier assembly within the housing and having an input circuit connected to said input terminal means and having an output circuit, switch means adapted to selectively operatively connect the output terminals to said input circuit for A.C. welding and to said output circuit for D.C. welding, and cooling means mounted within said housing and interconnected with said rectifying assembly for D.C. load determinant operation whereby said cooling means is adapted to be energized only when said switch means is in position for D.C. welding.

8. A conversion unit adapted to be attached to the output of an A.C. arc welding machine to establish a D.C. output suitable for arc welding, which comprises a housing having input terminal means and output terminal means, a rectifier assembly mounted within the housing and having an input circuit connected to said input terminal means and having an output circuit, switch means adapted to selectively operatively connect the output terminals across said input circuit for A.C. arc welding and across said output circuit for D.C. arc welding, and an alternating current motor operatively serially connected in said input circuit between the rectifier assembly and the connection of said switch means to said input circuit whereby the cooling means is only adapted to be energized when said switch means is in position for D.C. welding.

9. A conversion unit adapted to be attached to the output of an A.C. arc welding machine to establish a D.C. output suitable for arc welding, which comprises a housing having input terminal means and output terminal means, a rectifier assembly mounted within the housing and having an input circuit connected to said input terminal means and having an output circuit, a small shaded-pole motor and fan supported by said housing and adapted to pass air over said rectifier assembly, and an input load line in said input circuit directly interlinked with said motor to energize the motor incident to direct current arc welding.

10. A convertor unit adapted to be connected to the output of an A.C. arc welding machine to establish a D.C. output suitable for arc welding, which comprises a box-like housing having a centrally recessed front portion, a rectifier assembly mounted within said housing and having output junctions and input junctions, connecting leads connected to said input junctions and extending outwardly through the recessed front portion for connection to an A.C. arc welding machine, a pair of output terminals mounted one each on opposite side walls of said recess and connected to said output junctions, and cooling means responsive to the flow of current in the convertor unit mounted within the housing thereof in cooling relation to said rectifier assembly and electrically interconnected with the rectifier assembly to provide maximum cooling during current flow relatively independent of fluctuations in the circuit voltage.

11. A convertor unit adapted to be connected to the output of an A.C. arc welding machine to establish a D.C. output suitable for arc welding, which comprises a box-like housing having a centrally recessed front portion, a rectifier assembly mounted within said housing and having output junctions and input junctions, connecting leads connected to said input junctions and extending outwardly through the recessed front portion for connection to an A.C. arc welding machine, a pair of output terminals mounted one each on opposite side walls of said recess, switch means mounted within said housing and adapted to selectively connect the pair of output terminals to said output junctions for straight polarity arc welding and for reverse polarity arc welding and to said connecting leads for A.C. arc welding, switch operating means mounted on the top of said housing and coupled to said switch means for manual positioning of the switch means, and cooling means mounted within the housing in cooling relation to said rectifier assembly and electrically interconnected with the rectifier assembly for D.C. load determinant operation.

12. In combination, an alternating current input, a direct current circuit having rectifying means for rectifying said alternating current input to establish a substantially direct current load current with periodically recurring pulses superimposed in the current, and pick up means operatively electrically connected to constitute a part of the output portion of said circuit to provide an alternating current source proportional to the magnitude of said periodically recurring pulses.

13. A dual power source, comprising rectifier means adapted to be connected to an alternating current power source having a drooping load characteristic and adapted to provide a direct current output to a D.C. load with said direct current output having a ripple component of twice the frequency of the alternating current power source, said ripple component varying a proportion to the magnitude of the direct current output, and pick up means operatively electrically connected to constitute a part of the direct current output portion of said circuit to provide an alternating current source proportional to the magnitude of said ripple component.

14. Cooling apparatus for temperature sensitive rectifier means connected to an alternating current source and said rectifier means being adapted to provide a pulsating direct current, which comprises a direct current circuit connected to the output of the rectifier means, transformer means connected in said direct current circuit to provide an alternating current output in response to the ripple in said pulsating direct current, and cooling means connected for operation to said alternating current output and disposed adjacent said rectifier means to cool the rectifier means in proportion to the direct current output.

15. In combination with a solid state rectifier apparatus adapted to rectify an alternating current input to provide a direct current for a direct current load and having a ripple signal which is proportional to the amplitude of the direct current superimposed on the direct current, inductive means connected in the output of the rectifier apparatus to reduce the magnitude of said ripple signal, said inductive means including a winding inductively coupled thereto to provide an alternating current output proportional to said ripple signal, and alternating current operated cooling means connected to said winding and disposed adjacent said rectifier to cool the rectifier in direct proportion to the current output of the rectifier.

16. In a direct current arc welder, an alternating current power source, a plurality of solid state rectifier elements arranged to provide a rectifier adapted to be connected to said alternating current source to provide a direct current output, said direct current output comprising a series of immediately successive similar current pulses, output leads connected to the rectifier output and adapted to be connected to an electrode and a workpiece, an inductor having an iron core and a winding connected in said output leads in series circuit with the electrode and the workpiece to stabilize an arc established by the arc welder, a second winding wound on said iron core in inductive relation to said first winding to provide an alternating current having approximately twice the frequency of said alternating current source, and an electrically operated cooling device disposed in cooling relation to said rectifier plates and being connected for energization in circuit with said second winding whereby the operation thereof is proportional to the welding current.

17. Welding apparatus for A.C. or D.C. arc welding comprising, in combination an alternating current welding transformer adapted to be connected to an alternating current power source and having a drooping voltage characteristic, said transformer being adapted to furnish A.C. welding current, dry plate rectifying means adapted to be connected to the output of the welding transformer to furnish D.C. welding current having a ripple current component, a transformer having a first winding serially connected in a circuit with the output of the rectifying means and having a second winding magnetically coupled to said first winding, said second winding providing a pulsating voltage established by the ripple current component of the D.C. welding current, and a fan disposed in cooling relation to the rectifying means and connected in an operating circuit with said second winding to cool the rectifying means in proportion to the D.C. welding current and during the periods of arc outage when the voltage approaches the minimum value.

18. Apparatus to convert an A.C. arc welding transformer having a drooping voltage characteristic to a D.C. arc welding power source, which comprises a full-wave dry-plate rectifier assembly adapted to be connected to the output of said transformer to provide a direct current output for D.C. arc welding, said direct current output having a ripple frequency component which varies in amplitude in accordance with changes in the amplitude of the direct current output, output leads connected to said rectifier assembly, an inductor having an iron core and a winding wound on said core and connected in one of the output leads, a second winding wound on said core to inductively couple the second winding to the first-named winding to provide an alternating current output proportional to the ripple frequency component, and a cooling fan disposed in cooling relation with said rectifier assembly and being connected to said second winding for energization in proportion to the current output of said rectifier assembly.

19. In an alternating current power circuit adapted to furnish a relatively heavy load current from a power source, an alternating current motor having a relatively low output and having a magnetic core and operating in proportion to the alternating current excitation of said core relatively independently of the voltage in said circuit and during periods of short circuit, and a load line connecting a load to the power source and interlinked with said magnetic core to simultaneously energize said load and said motor.

20. In a rectifying circuit connected to an alternating current source and a direct current load and employing temperature sensitive rectifying devices, cooling means for said rectifying device including a dynamo-electric machine having a magnetic core, and an alternating current input lead connected to said rectifying devices and operatively wound on said magnetic core to simultaneously supply a direct current to said load and to excite said dynamo-electric machine operation in direct proportion to the load current.

21. In a rectifying circuit connected to an alternating current source and a direct current load and employing temperature-sensitive rectifying elements, cooling means including a shaded-pole motor having a generally closed magnetic path, the effectiveness of said cooling means being directly proportional to the energization of said motor, and an alternating current input lead means connected to said rectifying elements and passing perpendicularly through said magnetic path to simultaneously excite the shaded-pole motor and the direct current load, the excitation of the motor being in direct proportion to the direct current supplied to the load.

22. In an arc welding circuit having a temperature-sensitive rectifier apparatus adapted to be connected to an alternating current source to provide a direct current output, a cooling motor having a magnetic field core and operating in response to alternating current excitation of said field core, cooling means operated by said motor and disposed adjacent said rectifier apparatus to cool the latter, and lead cable means connected to said source and to said rectifier to carry load current therebetween and directly interlinked with said field core to energize the motor in proportion to the welding current.

23. In an arc welding circuit having temperature-sensitive rectifying apparatus to provide a direct current welding output from an alternating current input, cooling means, a shaded-pole motor operating said cooling means in proportion to the excitation thereof and having an encircling magnetic field core, and a connecting lead connected to the alternating current input and to the rectifying apparatus to carry current therebetween, said connecting lead passing through said field core to serve as the sole source of field excitation for the motor.

24. In combination, an alternating current power source, a direct current circuit having rectifying means to rectify said alternating current to establish a substantially direct current load current having periodically recurring pulses superimposed in the load current, an inductance winding serially connected in the output circuit of the direct current circuit, a low energy electrically operated device connected across at least a portion of said inductance winding, and a blocking capacitor connected in series with said device to block direct current from the device.

25. A conversion unit adapted to be attached to the output of an A.C. arc welding machine to establish a D.C. output suitable for arc welding, which comprises a housing having input terminal means and output terminal means, a rectifier assembly within the housing having an input circuit connected to said input terminal means and having an output circuit, a smoothing inductor serially connected in said output circuit, and electrically operated cooling means mounted in cooling relation to said rectifier assembly and having an energizing winding conductively connected across said smoothing inductor to establish cooling in direct proportion to the load current when supplying direct current to an arc.

References Cited in the file of this patent

UNITED STATES PATENTS

| 1,959,513 | Weyandt | May 22, 1934 |
| 2,424,344 | Veinott | July 22, 1947 |
| 2,757,296 | Bichsel | July 31, 1956 |

FOREIGN PATENTS

| 486,839 | Germany | Nov. 25, 1929 |
| 419,042 | Great Britain | Nov. 5, 1934 |
| 469,045 | Great Britain | July 19, 1937 |

UNITED STATES PATENT OFFICE
CERTIFICATE OF CORRECTION

Patent No. 3,059,164            October 16, 1962

Arthur E. Johnson

It is hereby certified that error appears in the above numbered patent requiring correction and that the said Letters Patent should read as corrected below.

Column 12, line 18, for "a" read -- in --.

Signed and sealed this 19th day of March 1963.

(SEAL)
Attest:

ESTON G. JOHNSON

Attesting Officer

DAVID L. LADD
Commissioner of Patents